(12) United States Patent
Jones (10) Patent No.: US 12,164,890 B2
(45) Date of Patent: Dec. 10, 2024

(54) ANTI-FRAGILE SOFTWARE SYSTEMS

(71) Applicant: Raytheon Company, Waltham, MA (US)

(72) Inventor: Frederick K. Jones, Tucson, AZ (US)

(73) Assignee: Raytheon Company, Tewksbury, MA (US)

( * ) Notice: Subject to any disclaimer, the term of this patent is extended or adjusted under 35 U.S.C. 154(b) by 0 days.

(21) Appl. No.: 17/380,203

(22) Filed: Jul. 20, 2021

(65) Prior Publication Data

US 2023/0027823 A1 Jan. 26, 2023

(51) Int. Cl.
*G06F 8/30* (2018.01)
*G06F 8/41* (2018.01)
*G06F 21/57* (2013.01)

(52) U.S. Cl.
CPC ............... *G06F 8/37* (2013.01); *G06F 8/443* (2013.01); *G06F 21/577* (2013.01); *G06F 2221/033* (2013.01)

(58) Field of Classification Search
CPC .......... G06F 8/37; G06F 8/443; G06F 21/577; G06F 2221/033
See application file for complete search history.

(56) References Cited

U.S. PATENT DOCUMENTS

| | | | |
|---|---|---|---|
| 7,962,798 B2 | 6/2011 | Locasto et al. | |
| 8,387,026 B1 * | 2/2013 | Hundt | G06F 8/443 717/151 |
| 10,929,542 B2 | 2/2021 | Jones et al. | |
| 11,288,061 B1 * | 3/2022 | Johnson | G06F 8/51 |
| 2007/0033578 A1 * | 2/2007 | Arnold | G06F 8/443 717/130 |
| 2009/0282477 A1 * | 11/2009 | Chen | G06F 21/577 726/22 |
| 2012/0124410 A1 | 5/2012 | Chun et al. | |
| 2012/0167065 A1 * | 6/2012 | Urakhchin | G06F 8/37 717/143 |
| 2013/0205388 A1 * | 8/2013 | Hunt | G06F 8/443 726/22 |
| 2015/0242636 A1 * | 8/2015 | Khan | H04L 63/1433 726/25 |
| 2019/0114401 A1 * | 4/2019 | De | G06F 21/64 |
| 2022/0207150 A1 * | 6/2022 | Britton | G06F 8/71 |

OTHER PUBLICATIONS

Kuperman et al., "Detection and Prevention of Stack Buffer Overflow Attacks" (Year: 2005).*
Yu et al., "RaceTrack: Efficient Detection of Data Race Conditions via Adaptive Tracking" (Year: 2005).*

(Continued)

*Primary Examiner* — Phillip H Nguyen (57) ABSTRACT

A method includes generating output code based on input code using a compiler or translator and providing the output code to one or more platforms for execution. The method also includes receiving feedback associated with the execution of the output code, where the feedback identifies at least one of: one or more failures during the execution of the output code and one or more performance characteristics of the execution of the output code. The method further includes modifying the compiler or translator based on the feedback and generating additional output code using the modified compiler or translator.

20 Claims, 2 Drawing Sheets

(56) References Cited

OTHER PUBLICATIONS

Ashouri et al., "A Survey on Compiler Autotuning using Machine Learning" (Year: 2018).*
Blackmore et al., "Automatically Tuning the GCC Compiler to Optimize the Performance of Applications Running on Embedded Systems" (Year: 2017).*
Mozilla, "Loading and running WebAssembly code", https://developer.mozilla.org/en-US/docs/WebAssembly/Loading_and_running, Jun. 2021, 5 pages.
GitHub, "WASI-intro.md", https://github.com/bytecodealliance/wasmtime/blob/main/docs/WASI-intro.md, Jun. 2020, 2 pages.
Wikipedia, "WebAssembly", https://en.wikipedia.org/wiki/WebAssembly, Jul. 13, 2021, 22 pages.
Larsen et al., "SoK: Automated Software Diversity", 2014 IEEE Symposium on Security and Privacy, May 2014, 16 pages.
Arteaga et al., "CROW: Code Diversification for WebAssembly", Aug. 2020, 14 pages.
International Search Report and Written Opinion of the International Searching Authority dated Sep. 26, 2022 in connection with International Patent Application No. PCT/US2022/033216, 10 pages.
Communication pursuant to Article 94(3) EPC dated Aug. 14, 2024 in connection with European Patent Application No. 22738193.6, 6 pages.

* cited by examiner

ANTI-FRAGILE SOFTWARE SYSTEMS

TECHNICAL FIELD

This disclosure is generally directed to software systems. More specifically, this disclosure is directed to anti-fragile software systems.

BACKGROUND

Software systems (devices or systems that execute software applications) can be fragile at various times, such as immediately after implementation and during early-phase testing of software. For example, software systems can often crash because unpredicted events occur during real-world use and the software is unable to handle real-world conditions. No software is perfect, and all software occasionally fails (possibly catastrophically) even after strenuous real-world testing. Unfortunately, the cycle time needed for data collection, analysis, and patching of software can be very long. In some applications, such as defense-related applications, these long cycle times can be intolerable.

SUMMARY

This disclosure relates to anti-fragile software systems.

In a first embodiment, a method includes generating output code based on input code using a compiler or translator and providing the output code to one or more platforms for execution. The method also includes receiving feedback associated with the execution of the output code, where the feedback identifies at least one of: one or more failures during the execution of the output code and one or more performance characteristics of the execution of the output code. The method further includes modifying the compiler or translator based on the feedback and generating additional output code using the modified compiler or translator.

In a second embodiment, an apparatus includes at least one processor configured to generate output code based on input code using a compiler or translator and provide the output code to one or more platforms for execution. The at least one processor is also configured to receive feedback associated with the execution of the output code, where the feedback identifies at least one of: one or more failures during the execution of the output code and one or more performance characteristics of the execution of the output code. The at least one processor is further configured to modify the compiler or translator based on the feedback and generate additional output code using the modified compiler or translator.

In a third embodiment, a non-transitory computer readable medium contains instructions that when executed cause at least one processor to generate output code based on input code using a compiler or translator and provide the output code to one or more platforms for execution. The medium also contains instructions that when executed cause the at least one processor to receive feedback associated with the execution of the output code, where the feedback identifies at least one of: one or more failures during the execution of the output code and one or more performance characteristics of the execution of the output code. The medium further contains instructions that when executed cause the at least one processor to modify the compiler or translator based on the feedback and generate additional output code using the modified compiler or translator.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
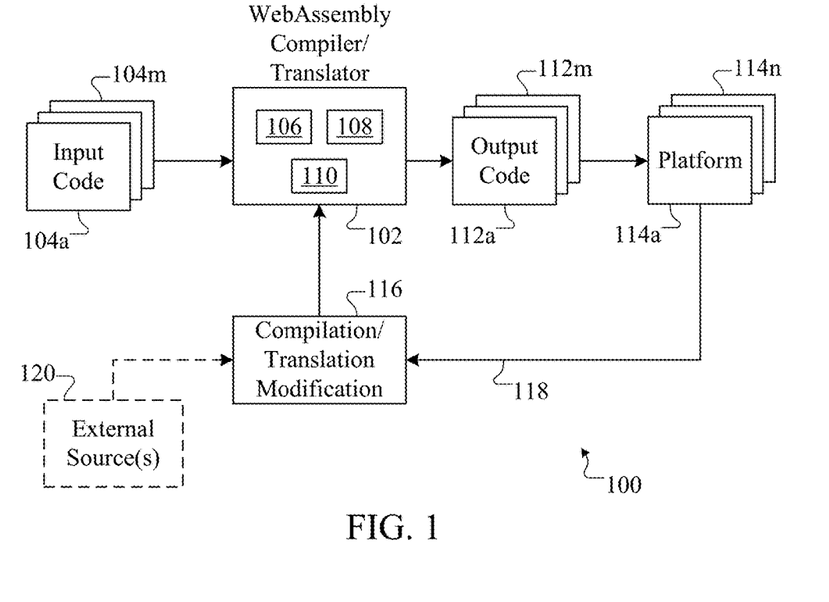
FIG. 1 illustrates an example system supporting anti-fragile software generation according to this disclosure.
Figure 2:
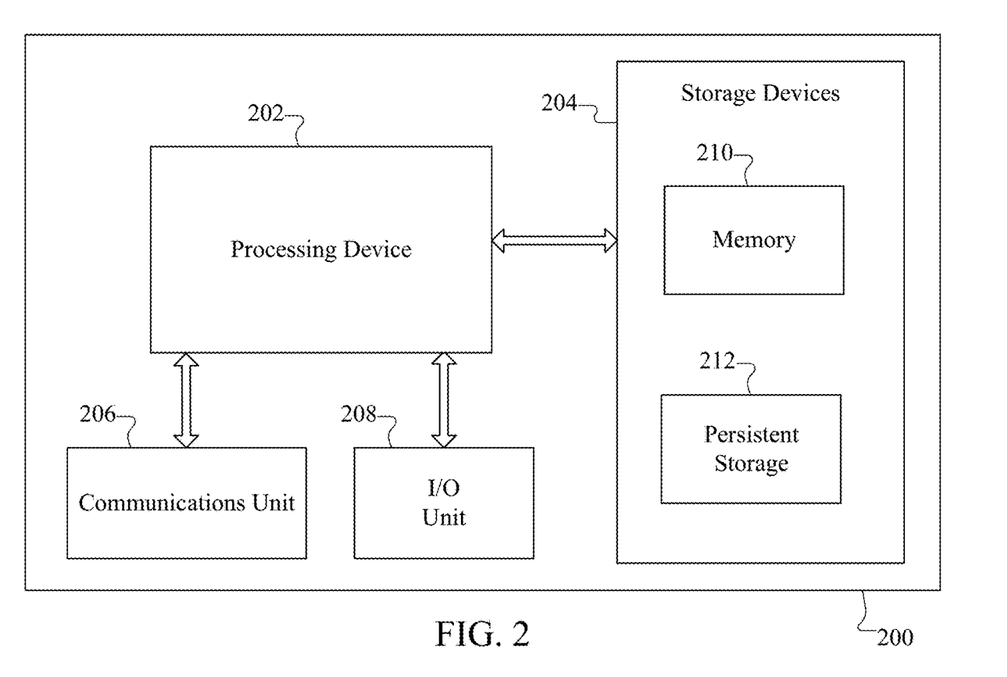
FIG. 2 illustrates an example device supporting anti-fragile software generation according to this disclosure.
Figure 3:
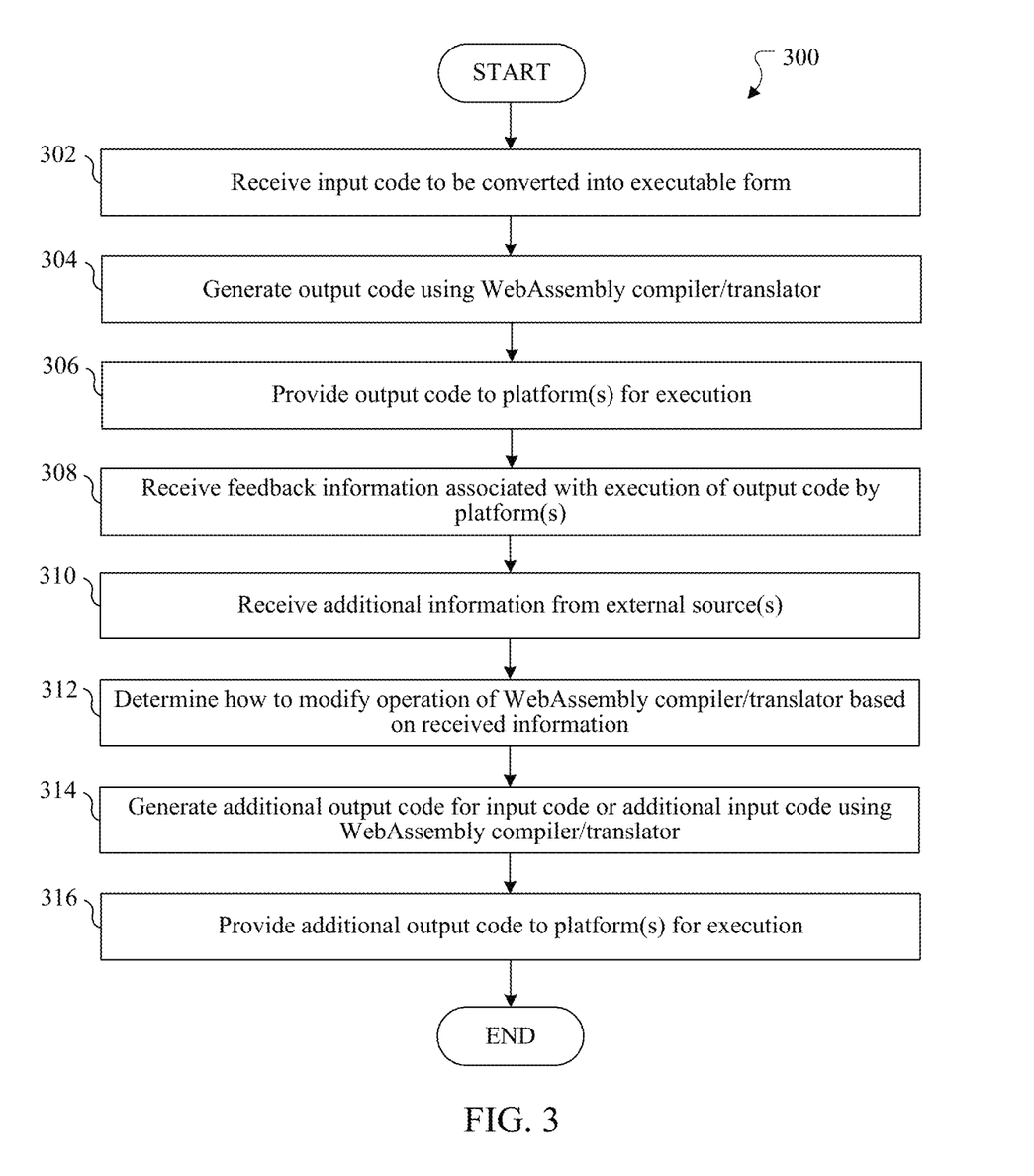
FIG. 3 illustrates an example method for anti-fragile software generation according to this disclosure.

FIGS. 1 through 3, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, software systems (devices or systems that execute software applications) can be fragile at various times, such as immediately after implementation and during early-phase testing of software. For example, software systems can often crash because unpredicted events occur during real-world use and the software is unable to handle real-world conditions. No software is perfect, and all software occasionally fails (possibly catastrophically) even after strenuous real-world testing. Unfortunately, the cycle time needed for data collection, analysis, and patching of software can be very long. In some applications, such as defense-related applications, these long cycle times can be intolerable.

This disclosure provides various techniques for generating anti-fragile software. As described in more detail below, these techniques leverage ahead-of-time (AoT) compilation or translation processes (such as those supported in WebAssembly workflows) to create binary code or native machine code based on input code. These techniques use various mechanisms during the AoT compilation or translation processes to incorporate knowledge from prior executions of software, such as prior failures during software executions and prior performance characteristics with software executions. Other knowledge may also be used, such as security problems or other issues associated with prior software. This knowledge allows the AoT compilation or translation processes to produce binary or native machine code that is more resilient to failure conditions, is more secure, and provides improve performance. For example, this knowledge can be used to reduce or eliminate the identified failures during subsequent software executions, improve performance characteristics with subsequent software executions, or improve security with subsequent software executions. The AoT compilation or translation processes can be repeated any number of times, where subsequent iterations of the AoT compilation or translation processes can incorporate more and more knowledge from prior executions of software. As a result, the AoT compilation or translation processes can produce less and less fragile software over time, thereby supporting the generation of anti-fragile software. These approaches can also support self-healing and self-optimization of the software.

FIG. 1 illustrates an example system 100 supporting anti-fragile software generation according to this disclosure. As shown in FIG. 1, the system 100 includes a WebAssembly compiler/translator 102, which generally operates to convert one or more instances of input code 104a-104m into executable form. Here, the WebAssembly compiler/translator 102 compiles or interprets each instance of input code 104a-104m into corresponding WebAssembly (WASM) assembly language code 106. The WebAssembly compiler/translator 102 can also convert the WASM assembly language code 106 into WASM binary code 108. The WebAssembly compiler/translator 102 may further convert the WASM binary code 108 into native code 110. The WebAssembly compiler/translator 102 provides output code 112a-112m corresponding to the input code 104a-104m, where each instance of output code 112a-112m represents the WASM binary code 108 or the native code 110 associated with the corresponding instance of input code 104a-104m.

The WebAssembly compiler/translator 102 includes any suitable logic for converting input code to WASM assembly code, WASM binary code, and/or native code. Various compilers and translators for the WebAssembly language have been developed, and additional compilers and translators for the WebAssembly language are sure to be developed in the future. Any of these WebAssembly compilers and translators can be used here (as modified as described below) to support the generation of anti-fragile software. The WebAssembly compiler/translator 102 supports the use of various types of input code languages, such as C, C++, Rust, Ada, Go, Haskell, FORTRAN, and COBOL (just to name a few).

One or more instances of output code 112a-112m here can be provided to one or more platforms 114a-114n for execution. The platforms 114a-114n that are used here can vary widely based on the application. For example, at least one platform 114a-114n may include an Internet browser that can execute one or more instances of the output code 112a-112m within the Internet browser. At least one platform 114a-114n may support the WebAssembly System Interface (WASI) specification, which allows one or more instances of the output code 112a-112m to be executed on a server, embedded system, or other system without modification. At least one platform 114a-114n may support the use of a run-time operating system (RTOS) that can execute one or more instances of the output code 112a-112m. At least one platform 114a-114n may allow for virtual execution of one or more instances of the output code 112a-112m, which may (among other things) allow for digitally-simulated execution of the output code 112a-112m and possible identification of flaws or other problems with the output code 112a-112m. As particular examples, the platforms 114a-114n may include one or more x86-based platforms, ARM-based platforms, MIPS-based platforms, or PowerPC-based platforms.

The input code 104a-104m and the output code 112a-112m may support any desired functionality depending on the application. For example, the input code 104a-104m and the output code 112a-112m may support functions such as Internet browser gaming, video conferencing, Internet-of-Things (IoT) security, sensor or actuator functionality, or a wide range of other applications executed in WINDOWS, LINUX, embedded, or other operating systems. As another example, the input code 104a-104m and the output code 112a-112m may be used with various weapons systems, where the specific output code provided to a specific weapon system can vary based on the current mission or tactical environment.

A compilation/translation modification function 116 uses various information to modify the operation of the WebAssembly compiler/translator 102. For example, the compilation/translation modification function 116 can receive feedback 118 related to execution of software on the platforms 114a-114n, such as information identifying how software (like previously-generated output code 112a-112m) failed during execution or performed during execution on one or more platforms 114a-114n. As particular examples, the feedback 118 may identify any faults that occurred during previous executions of software, memory usage characteristics that occurred during previous executions of software, or other characteristics of the previous executions of software. This allows the compilation/translation modification function 116 to collect appropriate telemetry associated with software execution and to use the telemetry to improve the next iteration or usage of the WebAssembly compiler/translator 102. The compilation/translation modification function 116 may also optionally receive information from one or more external sources 120, such as information identifying security vulnerabilities of software or information from one or more users.

The compilation/translation modification function 116 uses these types of information to modify how the WebAssembly compiler/translator 102 converts the input code 104a-104m into the output code 112a-112m in order to make future instances of the output code 112a-112m less fragile (more robust). For example, the compilation/translation modification function 116 can cause the WebAssembly compiler/translator 102 to alter how the output code 112a-112m is generated from the input code 104a-104m in order to avoid faults, improve performance, or improve security in the output code 112a-112m. Example ways in which the compilation/translation modification function 116 can modify how the WebAssembly compiler/translator 102 converts the input code 104a-104m into the output code 112a-112m are provided below. Note that these examples are for illustration only and that any other or additional modifications can be made to the operation of the WebAssembly compiler/translator 102 in order to alter how the output code 112a-112m is generated.

As one example modification that can be made to the operation of the WebAssembly compiler/translator 102, metrics associated with actual or simulated execution of output code 112a-112m can be included in the feedback 118. Examples of the types of metrics that might be included in the feedback 118 can include memory stack allocations, control flow graphs, and memory heap interactions. The compilation/translation modification function 116 can use these metrics to modify subsequent iterations of the WebAssembly compiler/translator 102, such as to modify how the memory stack allocations, control flow graphs, and memory heap interactions are implemented in subsequently-generated output code 112a-112m. As particular examples, the compilation/translation modification function 116 can modify how the WebAssembly compiler/translator 102 allocates memory for stacks, such as by increasing or decreasing the sizes of the stacks that are allocated. The compilation/translation modification function 116 can modify how the WebAssembly compiler/translator 102 allocates and frees memory locations, such as by allocating larger or smaller amounts of memory or by freeing memory locations sooner or later within the output code 112a-112m. The compilation/translation modification function 116 can modify how the WebAssembly compiler/translator 102 inserts traps into the output code 112a-112m, such as by inserting or removing a trap that attempts to access an unavailable memory location or otherwise interrupts normal flow control of instructions being executed. These types of changes can be based on prior failures and performance characteristics associated with prior executions of software by one or more of the platforms 114a-114n, which allows subsequent operations of the WebAssembly compiler/translator 102 to generate output code having fewer faults or improved performance.

As another example modification that can be made to the operation of the WebAssembly compiler/translator 102, information may be obtained from one or more external sources 120, where the information identifies attack vectors or other vulnerabilities associated with previous cyberattacks. For instance, the information may identify how side channel attacks (such as Spectre and Meltdown attacks) rely upon hardware or software vulnerabilities. The compilation/translation modification function 116 can modify how the WebAssembly compiler/translator 102 generates the output code 112a-112m in order to completely or partially avoid these types of vulnerabilities.

As yet another example modification that can be made to the operation of the WebAssembly compiler/translator 102, information may be obtained from one or more external sources 120, where the information identifies one or more portions of code to be translated or otherwise converted into output code 112a-112m. The one or more portions of code to be converted into output code 112a-112m may be identified based on any suitable criteria. In some cases, code that has been licensed for use by one or more particular users, organizations, or platforms 114a-114n may be selected. In other cases, code that has been classified under a particular secrecy classification may be selected or not selected for conversion. In still other cases, one or more environmental sensors or configurations may be used to provide information that can be used to select the code to be converted. The compilation/translation modification function 116 can use this information to selectively generate output code 112a-112m associated with selected portions of input code 104a-104m, WASM assembly language code 106, WASM binary code 108, or native code 110. This allows the compilation/translation modification function 116 and/or the WebAssembly compiler/translator 102 to effectively function as a runtime "preprocessor" at the assembly level or other level.

As still another example modification that can be made to the operation of the WebAssembly compiler/translator 102, the compilation/translation modification function 116 can support obfuscation of runtime execution using binary diversity in the output code 112a-112m. Binary diversity refers to the randomization of various execution parameters of binary code and is a powerful cyber-risk mitigation strategy. By randomizing the layout of instructions or data in memory, each binary executable can be unique, so attackers are unable to reliably land exploits on a suite of targets. Normally, binary diversity involves randomizing code and data placement on each power-up, but a runtime execution environment needs to accommodate this randomization (typically by using indirect function calls that rely on lookup tables). However, these operations add non-trivial runtime performance penalties due to additional memory accesses, and inefficiencies can be introduced, such as to a processor's branch history prediction logic. Indirect branching also increases the attack surface of the resulting software system, which increases susceptibility to attacks such as Spectre and control-flow integrity violating attacks.

The compilation/translation modification function 116 can support a different approach to binary diversity, such as by focusing on "per asset" diversity rather than "per power-up" diversity. For example, the compilation/translation modification function 116 can introduce binary diversity during generation of the output code 112a-112m. This binary diversity may include randomizing the order of at least some functional code blocks and the location of at least some data in memory. This binary diversity may also include randomizing the amount of stack space allocated to each of one or more functions within the output code 112a-112m. As a particular example, the stack space randomization may add a randomized padding in excess of the requested allocation as defined in the original input code 104a-104m or the associated WASM assembly language code 106, WASM binary code 108, or native code 110. The added randomized padding can be limited to some maximum permitted amount. Requests for heap memory allocations can similarly be randomly padded up to some maximum permitted amount. This binary diversity may further include insertion of chaff loops (loops that briefly perform unnecessary or irrelevant operations), nonsense conditional statements (conditionals that are always met or never met), no-operation (NOP) instructions (instructions that do nothing), and restarts (stopping loops or other operations and restarting them). In general, these modifications represent modifications that can be made in the output code 112a-112m without affecting the results of the functions performed by the output code 112a-112m.

Note that this approach to binary diversity preserves the performance benefits of direct branching to functions and removes reliance on indirect function calls and lookup tables. Also note that the compilation or translation of WASM assembly language code 106 or WASM binary code 108 into native code 110 can be performed on command or while in specific modes of a software system. For example, a refresh of native code based on WASM assembly code (or some other compilation or translation) can be performed during an extended built-in-test (BIT) of a software system or during reprogramming operations of a software system. The compilation or translation and associated diversity operations can also be performed offline. In addition, note that independent and isolated runtime binaries can be instantiated multiple times on a processing core while having binary diversity, which allows standby redundancy on an embedded software system.

In some cases, one or more of the platforms 114a-114n used here may represent at least one simulated version of one or more actual platforms. For example, a platform 114a-114n may represent a "digital twin" of an actual platform used to execute code, which means that the platform 114a-114n is designed to mimic the behavior (including code execution and memory access behaviors) of the actual platform. In these embodiments, it is possible for the WebAssembly compiler/translator 102 to generate output code 112a-112m, have the output code executed on at least one platform 114a-114n simulating an actual platform, and use the feedback 118 to modify additional versions of the output code 112a-112m. This may enable the compilation/translation modification function 116 to repeatedly (and rapidly) determine improvements to the compilation/translation process(es) performed by the WebAssembly compiler/translator 102 when generating the output code 112a-112m.

In some embodiments, the compilation/translation modification function 116 uses at least one trained machine learning model to adjust operation of the WebAssembly compiler/translator 102 based on the feedback 118, information from the external source(s) 120, or any other or additional information. For example, a machine learning model may be trained by providing different instances of input code 104a-104m to the WebAssembly compiler/translator 102 for generation of associated output code 112a-112m, executing the associated output code 112a-112m using one or more simulated or actual platforms 114a-114n, using feedback 118 to adjust the WebAssembly compiler/translator 102, and generating additional output code 112a-112m that is executed using one or more simulated or actual platforms 114a-114n. Optionally, input from one or more users may be obtained here, such as when a user is notified that the runtime behavior of generated output code 112a-112m deviates from a desired or normal runtime behavior (in which case the user may provide input identifying whether the deviation is acceptable or unacceptable and possible remedies for the deviation). This process can be repeated any number of times so that the machine learning model is trained to identify which modifications to the generation of the output code 112a-112m by the WebAssembly compiler/translator 102 result in improved characteristics of the output code 112a-112m (such as fewer faults, improved performance, improved security, or improved binary diversity). Once trained, the trained machine learning model can be used by the compilation/translation modification function 116 to determine how to compile/translate additional instances of input code 104a-104m.

Overall, the approaches supported by the compilation/translation modification function 116 help to improve the quality of software generated by the WebAssembly compiler/translator 102 for one or more platforms 114a-114n and reduce risks associated with the software. These risks can include computing hardware deficiencies, cyber-exploitation attempts, and environmental effects. Specific risks that can be reduced include random access memory failures, radiation-induced single event effects (SEEs), peripheral hardware device non-responsiveness, hardware vulnerabilities (such as to Spectre and Meltdown attacks), and cyber-attacks related to memory management defects. Moreover, the approaches supported by the compilation/translation modification function 116 allow for WebAssembly-based "templates" to become reference architectures for building anti-fragile software-intensive systems. With anti-fragile approaches, the generated software systems increase in strength and reliability due to exposure to adverse conditions. In addition, these approaches can be used to support self-healing and self-optimization of software systems.

Note that various functions shown in FIG. 1 and described above may be implemented in any suitable manner in the system 100. For example, in some embodiments, various functions in FIG. 1 may be implemented or supported using one or more software applications or other software/firmware instructions that are executed by at least one processor or other processing device. In other embodiments, at least some of the functions in FIG. 1 can be implemented or supported using dedicated hardware components. In general, the functions in FIG. 1 described above may be performed using any suitable hardware or any suitable combination of hardware and software/firmware instructions.

Although FIG. 1 illustrates one example of a system 100 supporting anti-fragile software generation, various changes may be made to FIG. 1. For example, components can be added, omitted, combined, further subdivided, replicated, or placed in any other suitable configuration according to particular needs. As particular examples, the system 100 may be used to convert any number of input code instances into output code instances for any number of platforms, and the system 100 may include any number of WebAssembly compilers/translators 102.

FIG. 2 illustrates an example device 200 supporting anti-fragile software generation according to this disclosure.

One or more devices 200 may, for example, be used to implement the functionality of the WebAssembly compiler/translator 102 and the compilation/translation modification function 116 of FIG. 1. However, the WebAssembly compiler/translator 102 and the compilation/translation modification function 116 may each be implemented in any other suitable manner.

As shown in FIG. 2, the device 200 denotes a computing device or system that includes at least one processing device 202, at least one storage device 204, at least one communications unit 206, and at least one input/output (I/O) unit 208. The processing device 202 may execute instructions that can be loaded into a memory 210. The processing device 202 includes any suitable number(s) and type(s) of processors or other processing devices in any suitable arrangement. Example types of processing devices 202 include one or more microprocessors, microcontrollers, digital signal processors (DSPs), application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 can include a network interface card or a wireless transceiver facilitating communications over a wired or wireless network. The communications unit 206 may support communications through any suitable physical or wireless communication link(s). The communications unit 206 may, for instance, support receipt of input code 104a-104m and providing of output code 112a-112m.

The I/O unit 208 allows for input and output of data. For example, the I/O unit 208 may provide a connection for user input through a keyboard, mouse, keypad, touchscreen, or other suitable input device. The I/O unit 208 may also send output to a display or other suitable output device. Note, however, that the I/O unit 208 may be omitted if the device 200 does not require local I/O, such as when the device 200 represents a server or other device that can be accessed remotely.

In some embodiments, the instructions executed by the processing device 202 include instructions that implement the functionality of the WebAssembly compiler/translator 102 and/or the compilation/translation modification function 116. Thus, for example, the instructions executed by the processing device 202 may convert input code 104a-104m into output code 112a-112m. The instructions executed by the processing device 202 may also or alternatively modify the conversion of the input code 104a-104m into the output code 112a-112m based on feedback 118, information from the external source(s) 120, or any other or additional information. Example techniques for modifying the conversion of the input code 104a-104m into the output code 112a-112m are provided above.

In particular embodiments, the functionality of at least the compilation/translation modification function 116 (and possibly the WebAssembly compiler/translator 102) can be implemented using an embedded FPGA (the processing device 202) in a larger system. This may allow for rapid generation of the output code 112a-112m as needed or desired. In other particular embodiments, the functionality of at least the compilation/translation modification function 116 (and possibly the WebAssembly compiler/translator 102) can be implemented using firmware embedded in or otherwise accessible to the processing device 202.

Although FIG. 2 illustrates one example of a device 200 supporting anti-fragile software generation, various changes may be made to FIG. 2. For example, computing and communication devices and systems come in a wide variety of configurations, and FIG. 2 does not limit this disclosure to any particular computing or communication device or system.

FIG. 3 illustrates an example method 300 for anti-fragile software generation according to this disclosure. For ease of explanation, the method 300 is described as being performed by the device 200 shown in FIG. 2 using the system 100 shown in FIG. 1. However, the method 300 may be performed using any other suitable device or system.

As shown in FIG. 3, input code is received at step 302, and output code associated with the input code is generated using a WebAssembly compiler/translator at step 304. This may include, for example, the processing device 202 receiving the input code 104a-104m, which may be obtained from any suitable source(s). This may also include the processing device 202 executing or otherwise implementing the WebAssembly compiler/translator 102 to generate the output code 112a-112m based on the input code 104a-104m. The output code is provided to one or more platforms for execution at step 306. This may include, for example, the processing device 202 providing the output code 112a-112m to one or more actual or simulated platforms 114a-114n for execution.

Feedback information associated with the execution of the output code by the one or more platforms is received at step 308, and additional information may be received from one or more external sources at step 310. This may include, for example, the processing device 202 receiving feedback 118 containing telemetry associated with the execution of the output code 112a-112m by the one or more actual or simulated platforms 114a-114n. This may also include the processing device 202 receiving information from one or more external sources 120, such as information related to cyber-security risks or information from one or more users (which may or may not be related specifically to the output code 112a-112m previously generated and executed).

A determination is made how to modify operation of the WebAssembly compiler/translator based (at least in part) on the received information at step 312. This may include, for example, the processing device 202 executing or otherwise implementing the compilation/translation modification function 116 to determine how to modify operation of the WebAssembly compiler/translator 102. As described above, the compilation/translation modification function 116 may modify operation of the WebAssembly compiler/translator 102 in various ways. For instance, the compilation/translation modification function 116 may use metrics in the feedback 118 related to actual or simulated execution of the output code 112a-112m (such as memory stack allocations, control flow graphs, and memory heap interactions), and the compilation/translation modification function 116 can use these metrics to modify subsequent iterations of the WebAssembly compiler/translator 102 (such as to modify how the memory stack allocations, control flow graphs, and memory heap interactions are implemented). The compilation/translation modification function 116 may use information associated with cyber-security threats to modify how the WebAssembly compiler/translator 102 generates the output code 112a-112m in order to completely or partially avoid creating certain types of vulnerabilities in the output code 112a-112m. The compilation/translation modification function 116 may use information related to one or more portions of code to be translated or otherwise converted into output code 112a-112m and modify operation of the WebAssembly compiler/translator 102 to convert only the one or more portions of code. The compilation/translation modification function 116 may use information related to target platforms or other information to determine how to provide binary diversity in the output code 112a-112m.

Additional output code (for the same original input code or for different input code) is generated at step 314 and provided to one or more platforms for execution at step 316. This may include, for example, the processing device 202 executing or otherwise implementing the WebAssembly compiler/translator 102 to generate additional output code 112a-112m using the same input code 104a-104m received in step 302 or using additional input code 104a-104m. Note that the WebAssembly compiler/translator 102 here generates the additional output code 112a-112m in a modified manner relative to step 304 due to the modification(s) made by the compilation/translation modification function 116 to the operation of the WebAssembly compiler/translator 102. This may also include the processing device 202 providing the additional output code 112a-112m to one or more actual or simulated platforms 114a-114n for execution. Note that the platform(s) 114a-114n used here may or may not be the same platform(s) 114a-114n as in step 306.

Although FIG. 3 illustrates one example of a method 300 for anti-fragile software generation, various changes may be made to FIG. 3. For example, while shown as a series of steps, various steps in FIG. 3 may overlap, occur in parallel, occur in a different order, or occur any number of times. As a particular example, steps 308-316 may be repeated any number of times to modify the operation of the WebAssembly compiler/translator 102 repeatedly. Ideally, over time, the WebAssembly compiler/translator 102 will produce better and better output code 112a-112m.

In some embodiments, various functions described in this patent document are implemented or supported by a computer program that is formed from computer readable program code and that is embodied in a computer readable medium. The phrase "computer readable program code" includes any type of computer code, including input code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including input code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    generating output code based on input code using a compiler or translator;
    providing the output code to one or more platforms for execution;
    receiving feedback associated with the execution of the output code, the feedback comprising telemetry identifying at least one of: one or more failures during the execution of the output code and one or more performance characteristics of the execution of the output code;
    performing, using a machine learning model and based on the telemetry, multiple types of modifications to the compiler or translator; and
    generating additional output code based on the input code using the modified compiler or translator, wherein generating the additional output code comprises using binary diversity to randomize an amount of stack space allocated to each of one or more functions associated with the additional output code.

2. The method of claim 1, wherein performing the multiple types of modifications to the compiler or translator comprises modifying the compiler or translator to at least one of:
    reduce or eliminate the one or more failures during execution of the additional output code; and
    improve the one or more performance characteristics of the execution of the additional output code relative to the execution of the output code.

3. The method of claim 1, wherein the telemetry comprises metrics associated with memory stack allocations, control flow graphs, and memory heap interactions during the execution of the output code.

4. The method of claim 1, further comprising:
    receiving information identifying one or more cybersecurity vulnerabilities; and
    modifying the compiler or translator based on the information;
    wherein modifying the compiler or translator comprises modifying the compiler or translator to partially or completely avoid creation of the one or more vulnerabilities in the additional output code.

5. The method of claim 1, further comprising:
    receiving information identifying one or more portions of the input code or additional input code to be converted using the compiler or translator;
    wherein performing the multiple types of modifications to the compiler or translator causes the compiler or translator to only convert the one or more portions of the input code or the additional input code.

6. The method of claim 1, wherein generating the additional output code further comprises using the binary diversity to at least one of:
    randomize an order of at least some functional code blocks associated with the additional output code;
    randomize an order of data used by the additional output code; and
    randomize heap memory allocations associated with the additional output code.

7. The method of claim 1, wherein the compiler or translator comprises a WebAssembly compiler or translator.

8. An apparatus comprising:
    at least one processor configured to:
        generate output code based on input code using a compiler or translator;
        provide the output code to one or more platforms for execution;
        receive feedback associated with the execution of the output code, the feedback comprising telemetry identifying at least one of: one or more failures during the execution of the output code and one or more performance characteristics of the execution of the output code;
        perform, using a machine learning model and based on the telemetry, multiple types of modifications to the compiler or translator; and
        generate additional output code based on the input code using the modified compiler or translator, wherein, to generate the additional output code, the at least one processor is configured to use binary diversity to randomize an amount of stack space allocated to each of one or more functions associated with the additional output code.

9. The apparatus of claim 8, wherein the at least one processor is configured to perform the multiple types of modifications to the compiler or translator to at least one of:
    reduce or eliminate the one or more failures during execution of the additional output code; and
    improve the one or more performance characteristics of the execution of the additional output code relative to the execution of the output code.

10. The apparatus of claim 8, wherein the telemetry comprises metrics associated with memory stack allocations, control flow graphs, and memory heap interactions during the execution of the output code.

11. The apparatus of claim 8, wherein the at least one processor is further configured to:
receive information identifying one or more cyber-security vulnerabilities; and
modify the compiler or translator based on the information to partially or completely avoid creation of the one or more vulnerabilities in the additional output code.

12. The apparatus of claim 8, wherein:
the at least one processor is further configured to receive information identifying one or more portions of the input code or additional input code to be converted using the compiler or translator; and
the at least one processor is configured to perform the multiple types of modifications to the compiler or translator to only convert the one or more portions of the input code or the additional input code.

13. The apparatus of claim 8, wherein, to generate the additional output code, the at least one processor is further configured to use the binary diversity to at least one of:
randomize an order of at least some functional code blocks associated with the additional output code;
randomize an order of data used by the additional output code; and
randomize heap memory allocations associated with the additional output code.

14. The apparatus of claim 8, wherein the compiler or translator comprises a WebAssembly compiler or translator.

15. A non-transitory computer readable medium containing instructions that when executed cause at least one processor to:
generate output code based on input code using a compiler or translator;
provide the output code to one or more platforms for execution;
receive feedback associated with the execution of the output code, the feedback comprising telemetry identifying at least one of: one or more failures during the execution of the output code and one or more performance characteristics of the execution of the output code;
perform, using a machine learning model and based on the telemetry, multiple types of modifications to the compiler or translator; and
generate additional output code based on the input code using the modified compiler or translator, wherein the instructions that when executed cause the at least one processor to generate the additional output code comprise instructions that when executed cause the at least one processor to use binary diversity to randomize an amount of stack space allocated to each of one or more functions associated with the additional output code.

16. The non-transitory computer readable medium of claim 15, wherein the instructions that when executed cause the at least one processor to perform the multiple types of modifications to the compiler or translator comprise instructions that when executed cause the at least one processor modify the compiler or translator to at least one of:
reduce or eliminate the one or more failures during execution of the additional output code; and
improve the one or more performance characteristics of the execution of the additional output code relative to the execution of the output code.

17. The non-transitory computer readable medium of claim 15, wherein:
the instructions when executed further cause the at least one processor to receive information identifying one or more cyber-security vulnerabilities; and
the instructions that when executed cause the at least one processor to perform the multiple types of modifications to the compiler or translator comprise instructions that when executed cause the at least one processor modify the compiler or translator based on the information to partially or completely avoid creation of the one or more vulnerabilities in the additional output code.

18. The non-transitory computer readable medium of claim 15, wherein:
the instructions when executed further cause the at least one processor to receive information identifying one or more portions of the input code or additional input code to be converted using the compiler or translator; and
the instructions that when executed cause the at least one processor to perform the multiple types of modifications to the compiler or translator comprise instructions that when executed cause the at least one processor modify the compiler or translator to only convert the one or more portions of the input code or the additional input code.

19. The non-transitory computer readable medium of claim 15, wherein the instructions that when executed cause the at least one processor to generate the additional output code further comprise instructions that when executed cause the at least one processor to use the binary diversity to at least one of:
randomize an order of at least some functional code blocks associated with the additional output code;
randomize an order of data used by the additional output code; and
randomize heap memory allocations associated with the additional output code.

20. The non-transitory computer readable medium of claim 15, wherein the compiler or translator comprises a WebAssembly compiler or translator.

* * * * *